(12) United States Patent
Peron et al.

(10) Patent No.: US 7,151,402 B2
(45) Date of Patent: Dec. 19, 2006

(54) TRIAC CONTROL CIRCUIT

(75) Inventors: Benoit Peron, Tours (FR); Ghafour Benabdelaziz, Saint Pierre des Corps (FR)

(73) Assignee: STMicroelectronics S.A. (FR)

( * ) Notice: Subject to any disclaimer, the term of this patent is extended or adjusted under 35 U.S.C. 154(b) by 0 days.

(21) Appl. No.: 10/836,420

(22) Filed: Apr. 29, 2004

(65) Prior Publication Data

US 2004/0217800 A1 Nov. 4, 2004

(30) Foreign Application Priority Data

Apr. 29, 2003 (FR) ................................. 03 05285

(51) Int. Cl.
*H03K 17/72* (2006.01)

(52) U.S. Cl. ..................... 327/476; 327/110

(58) Field of Classification Search ............. 327/110, 327/446, 452, 455, 469, 476, 582
See application file for complete search history.

(56) References Cited

U.S. PATENT DOCUMENTS

| 3,723,769 A | | 3/1973 | Collins |
| 3,920,955 A | * | 11/1975 | Nakata ..................... 219/501 |
| 5,051,681 A | * | 9/1991 | Schwarz ................... 318/786 |
| 5,914,628 A | | 6/1999 | Rault |
| 6,373,319 B1 | * | 4/2002 | Rault ....................... 327/452 |

FOREIGN PATENT DOCUMENTS

DE 2163622 A 6/1973

* cited by examiner

*Primary Examiner*—Jeffrey Zweizig
(74) *Attorney, Agent, or Firm*—Lisa K. Jorgenson; Bryan A. Santarelli; Graybeal Jackson Haley LLP

(57) ABSTRACT

A circuit for controlling a triac, comprising: a bidirectional current-limiting active element connecting the triac gate to its opposite power electrode; and a switch connecting the gate to the other power electrode of the triac.

22 Claims, 4 Drawing Sheets

TRIAC CONTROL CIRCUIT

PRIORITY CLAIM

This application claims priority from French patent application No. 03/05285, filed Apr. 29, 2003, which is incorporated herein by reference.

BACKGROUND OF THE INVENTION

1. Field of the Invention

The present invention relates generally to the control of bi-directional switches of triac type that automatically turn-off upon disappearance of the current through the switch. Such switches are often used to control loads powered by the electric supply mains and the switch turning-on is restarted at each half-period.

2. Discussion of the Related Art

FIG. 1 shows a first example of a conventional control circuit of a triac 1 controlling a load 2 (Q) powered by an A.C. power supply Vac (terminals P and N). In the example of FIG. 1, triac 1 has been connected in series with load 2. It should however be noted that the triacs may also be connected in parallel with the load that they control, but a parallel connection is consistent with what will be described hereafter.

In the example of FIG. 1, gate g of the triac is connected to that of the triac power electrodes which stands opposite to load 2 by a switch 3 (in this example, an NMOS transistor). Further, gate g is connected by a current-to-voltage conversion resistor R to a first terminal (+) of application of a D.C. voltage Vdc necessary to the triac control. The second terminal (−) of application of voltage Vdc is connected to terminal N of application of the A.C. voltage opposite to that to which load 2 is connected, that is, to one of the power electrodes of triac 1 and to the source of transistor 3. The gate of transistor 3 receives a control signal CTRL of logic type enabling voltage control of triac 1.

In the example of FIG. 1, triac 1 is normally on, that is, in the absence of a control signal on terminal CTRL, triac 1 is on, provided that a D.C. voltage Vdc is applied between terminals + and −. Transistor 3 is used to block the triac by preventing its automatic restarting by the short-circuiting of its gate and of its power electrode connected to terminal N.

A disadvantage of the circuit of FIG. 1 is that it generates a permanent consumption in the control circuit when triac 1 is desired to be maintained off.

Another disadvantage is that it is necessary to provide a current coming from a D.C. auxiliary power supply (voltage Vdc).

Another disadvantage of providing a normally-on triac is that in case of a malfunction of the control circuit (not shown) providing signal CTRL, triac 1 is on and load 2 remains powered. Such a situation may be dangerous and is, to say the least, not desirable.

To make triac 1 normally off in the diagram of FIG. 1, a switch 3 which is normally on and which is turned off by its control signal, which accordingly turns on triac 1, could be provided. However, the disadvantage of requiring an auxiliary power supply remains present, as well as the presence of a permanent leakage current in switch 3.

FIG. 2 shows a second conventional example of a control circuit of a triac 1 for controlling a load 2 with which it is placed in series between two terminals P and N of application of an A.C. voltage Vac. In this example, gate g of the triac is connected by a resistor R' to power electrode 10 of the triac on the side of load 2 and is connected to terminal N (power electrode 11 of the triac opposite to terminal 2) by a switch 4 receiving a control signal CTRL. Resistor R' starts triac 1 at each halfwave of the A.C. power supply, provided that gate g and electrode 11 are not short-circuited by switch 4.

Thus, if switch 4 is a normally-off switch, triac 1 is made normally on, which reproduces the security disadvantage discussed hereabove in relation with FIG. 1.

However, by providing a normally-on switch 4, triac 1 is blocked by default and signal CTRL causes the turning off of switch 4 when load 2 is desired to be supplied.

The circuit of FIG. 2 has the advantage of not requiring the presence of a D.C. auxiliary power supply to provide the firing of triac 1.

Further, conversely to the diagram of FIG. 1 where a leakage current is permanently present either in the triac gate, or in control MOS transistor 3, the leakage current of the example of FIG. 2 is only present in the triac gate through resistor R'.

In the diagram of FIG. 1, the use of an auxiliary power supply considerably increases the control circuit consumption. This requires either oversizing the corresponding converters, or providing batteries of sufficient capacity.

In the solution of FIG. 2, the current necessary to turn on triac 1 comes from A.C. voltage Vac, and thus generally from the electric supply mains.

A disadvantage of this solution, however, remains that triac 1 exhibits a delay upon firing at each halfwave of the A.C. power supply. This delay is due to the fact that the current running through resistor R' must, at each halfwave of A.C. power supply Vac, become greater than the firing current of triac 1 before said triac starts conducting. Since this current also runs through load 2, the firing delay also depends on this load.

The delay is given by the following relation:

$$\Delta t = \frac{1}{\omega} \cdot \text{Arcsin}\left(\frac{I_g \cdot (Z2 + R') + V_{gt}}{Vac_{cur}}\right),$$

where $I_g$ represents the gate current necessary to start triac 1, $Z2$ represents the impedance of load 2, $V_{gt}$ represents the voltage of gate g of the triac, $Vac_{cur}$ represents the maximum value of A.C. voltage Vac, and $\omega$ represents the pulse of voltage Vac.

A firing delay of the triac at each halfwave of the power supply is prejudicial since this causes unwanted current and/or voltage peaks.

FIGS. 3A and 3B are timing diagrams illustrating the triac firing delay phenomenon on a resistive load. FIG. 3A shows an example of the shape of A.C. supply voltage Vac and of voltage V1 across the triac. FIG. 3B illustrates the shape of current I through load 2. For simplification, leakage currents and the voltage drops that they generate are here neglected.

Triac 1 is initially assumed to be off. Accordingly, current I is zero and voltage V1 across triac 1 corresponds to A.C. voltage Vac. The state of control signal CTRL is assumed to be reversed at a time t1 to turn triac 1 on. If time t1 occurs sufficiently late in a period of voltage Vac, the triac starts at this time t1 and a non-zero current I then flows through load Q. Since the presence of a resistive load has been assumed, the shape of current I is synchronous with the shape of voltage Vac. At the next zero crossing of the current flowing through the triac, said triac turns off. The end of the delay Δt following the beginning of the halfwave must then be awaited before the triac firing occurs. The higher the resistance of load Q, the greater the firing delay will be before the firing current of the triac is reached.

A new reversal of current CTRL is assumed at time t2 to turn off the circuit by the turning-off of triac 1. In the example of FIG. 2, this amounts to turning on switch 4. The triac is however only blocked at the next zero crossing of voltage Vac by the canceling of the current flowing therethrough. From this zero crossing on, voltage V1 becomes approximately equal again to voltage Vac.

It should be noted that for such a circuit to operate, resistance R' must be very large as compared to the resistance of load 2, unless which the leakage current when switch 4 is on would be too high, which would amount to turning on load 2.

FIGS. 4A and 4B illustrate the operation of a conventional triac control circuit of the type shown in FIG. 2 on an essentially inductive load Q.

Here again, a turning-off of switch 4 is assumed at a time t1 to fire the triac. Since the load is inductive, current I through the load increases from 0 (instead of the peak on a resistive load). The inductive load delays the triac turning-off upon zero crossing of voltage Vac. However, this causes a voltage peak in V1 at each zero crossing of current I since voltage Vac across the circuit is then different from zero.

At a time t2 where control signal CTRL reverses to turn on switch 4, current I does not immediately disappear, but awaits the end of its halfwave. At that time, voltage V1 abruptly joins voltage Vac.

The significance of voltage peaks V1 depends on the value of the inductance of load 2, which conditions the phase-shift between current I in the load and A.C. voltage Vac.

SUMMARY OF THE INVENTION

An embodiment of the present invention improves known control circuits of the type drawing their power from the A.C. load supply voltage (FIG. 2).

Another embodiment of the present invention more specifically minimizes the firing delay on a resistive load.

Another embodiment of the present invention also suppresses voltage peaks on an inductive load.

More generally, embodiments of the present invention improve the immunity to voltage and current peaks of the triac of its control circuit.

Therefore, an embodiment of the present invention provides a circuit for controlling a triac, comprising:
a bidirectional current-limiting active element connecting the triac gate to its opposite power electrode; and
a switch connecting the gate to the other power electrode of the triac.

According to an embodiment of the present invention, the switch is of normally-on type.

According to an embodiment of the present invention, said current-limiting element is formed of two current sources connected head-to-tail.

According to an embodiment of the present invention, a diode is connected in parallel to each current source.

According to an embodiment of the present invention, said current sources are formed of N-channel MOS transistors.

According to an embodiment of the present invention, said transistors are depleted transistors.

An embodiment of the present invention also provides a circuit for controlling a load intended to be supplied by an A.C. voltage of the type comprising a triac.

Features and advantages of the present invention will be discussed in detail in the following non-limiting description of specific embodiments in connection with the accompanying drawings.

DETAILED DESCRIPTION

Figure 1:
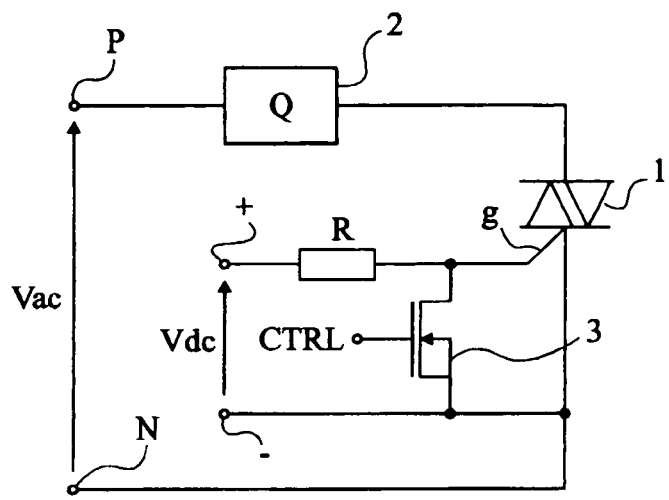
FIG. 1, previously described, shows a first conventional triac control assembly.

Same elements have been referred to with same reference numerals in the different drawings. For clarity, only those elements that are deemed necessary to the understanding of the present invention have been shown in the drawings and will be described hereafter. In particular, the structure of the circuits providing the logic control signals has not been detailed, since no modification of these circuits is typically required with respect to conventional solutions.

An embodiment of the present invention makes a triac normally on by connecting its gate to the opposite power electrode by means of a current-limiting circuit bidirectional for the current and the voltage. The value of the current conditioned by the limiter is chosen to enable starting of the triac under a low voltage.

According to an embodiment of the present invention, the current-limiting circuit is an active circuit, conversely to a resistor forming a passive circuit.

Figure 5:
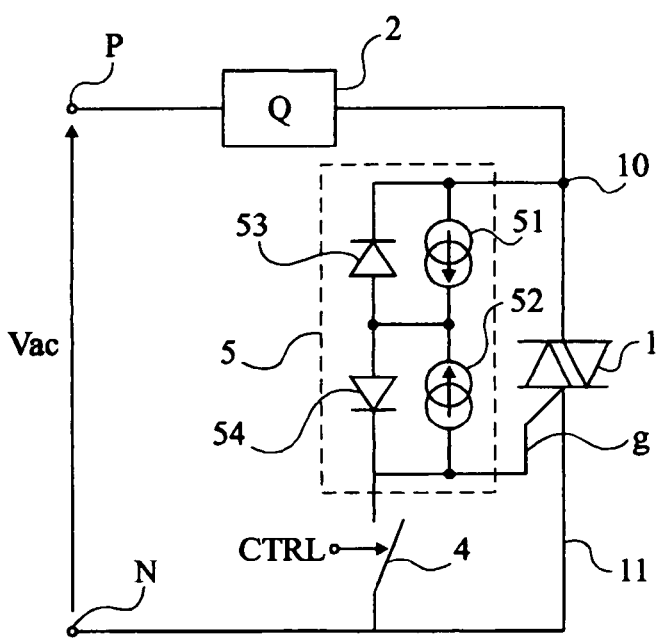
FIG. 5 schematically shows an embodiment of a triac control circuit according to the present invention.

FIG. 5 shows an embodiment of a circuit for controlling a triac 1 intended to control a load 2 (Q) supplied by an A.C. voltage Vac. As previously, the example of FIG. 5 relates to a triac connected in series with a load 2 between two terminals P and N of application of voltage Vac. It should however be noted that this embodiment of the present invention also applies to the case where triac 1 is connected in parallel with load 2.

Figure 2:
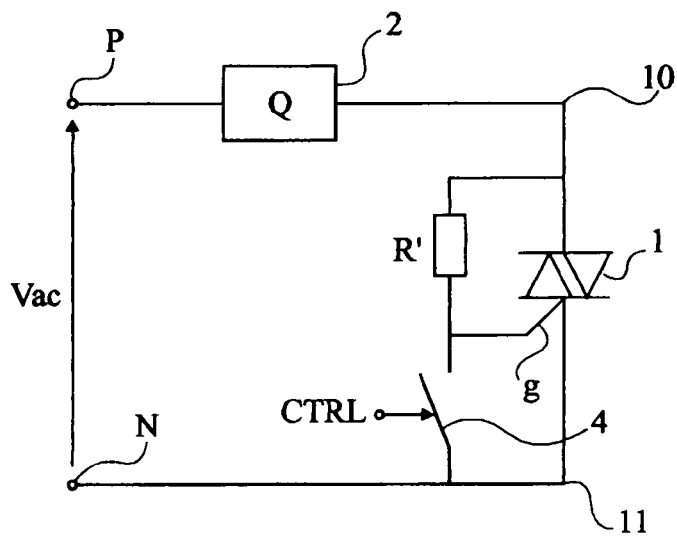
FIG. 2 shows a second example of a conventional triac control assembly.

The control circuit is formed of an active current-limiting element 5 connected between gate g of triac 1 and its opposite power electrode 10 (connected to load 2) and of a switch 4 connecting gate g of the triac to its other power electrode 11, switch 4 forbidding the automatic starting of triac 1 when on. Switch 4 is controlled by a signal CTRL similar to that of the conventional case of FIG. 2.

According to this embodiment of the present invention, active current-limiting element 5 is formed of two current sources 51 and 52 head-to-tail, each one associated with a diode 53 or 54 ensuring the bidirectional character of the device. In the example of FIG. 5, the anodes of diodes 53 and 54 are connected to the junction point of current sources 51 and 52, their respective cathodes being connected to the other terminals of sources 51 and 52 respectively connected to terminal 10 and to gate g.

The above description is functional and current-limiting element 5 may be formed in practice in several ways, provided to respect this functionality.

As long as switch 4 remains off, triac 1 is said to be normally on in that it automatically starts upon each half-wave of voltage Vac. In halfwaves arbitrarily said to be positive (voltage of terminal P greater than the voltage of terminal N with the conventions of FIG. 5), source 51 and diode 54 enable firing of the triac. In negative halfwaves, source 52 and diode 53 enable this firing.

The values imposed by current sources 51 and 52 are selected to enable starting of triac 1 under the smallest possible voltage. Indeed, the higher the current, the higher the system's leakage current. On this regard, it should be noted that this embodiment of the present invention respects the advantageous functionality of FIG. 2, that is, the power supply necessary to the triac starting is drawn directly from A.C. power supply Vac and the leakage current only corresponds to the current in the gate of triac 1.

It should further be noted that, conversely to the circuit of FIG. 1 where the triac is on when switch 3 is off, the circuit of FIG. 5 is compatible with the use of a switch 4 of normally-on type forbidding the starting of triac 1 in case of a failure of the control circuit providing signal CTRL.

For example, switch 4 is formed of a P-channel JFET transistor or of a P-channel depleted MOS transistor which is thus on if a zero voltage is applied on its gate.

Current-limiting element 5 is for example formed of two MOS transistors made normally on and forming current sources 51 and 52. Preferably, the MOS transistors are turned on for a zero gate voltage by being, for example, depleted-type MOS transistors. Triac 1 then starts as soon as supply voltage Vac becomes greater than the circuit's dynamic resistance (resistance of load 2) multiplied by the pre-formed channel current. Such a device is equivalent to two junctions in series and thus minimizes the voltage drop between electrode 10 and gate g.

An advantage of the circuit of FIG. 5 is that current-limiting element 5 is entirely integratable.

Figure 3A:
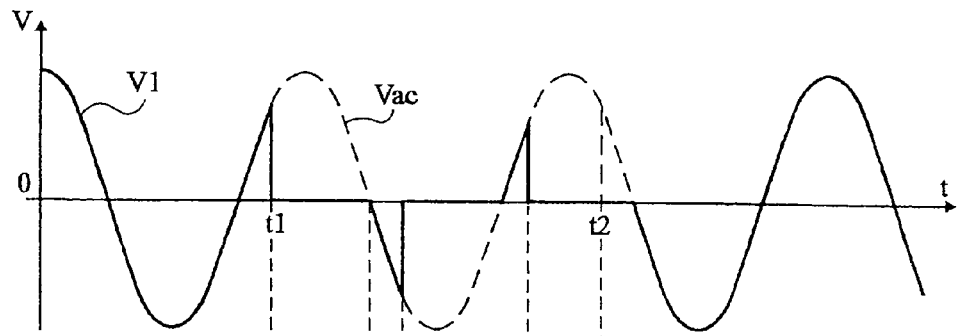
FIGS. 3A and 3B illustrate the operation of the circuit of FIG. 2 on a resistive load.
Figure 3B:
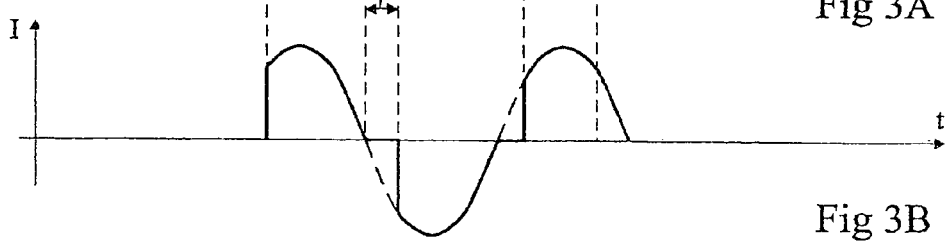
Figure 6A:
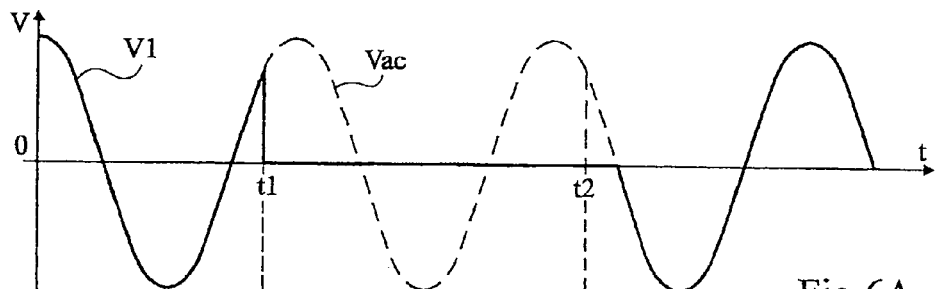
FIGS. 6A and 6B illustrate the operation of the circuit of FIG. 5 on a resistive load.
Figure 6B:
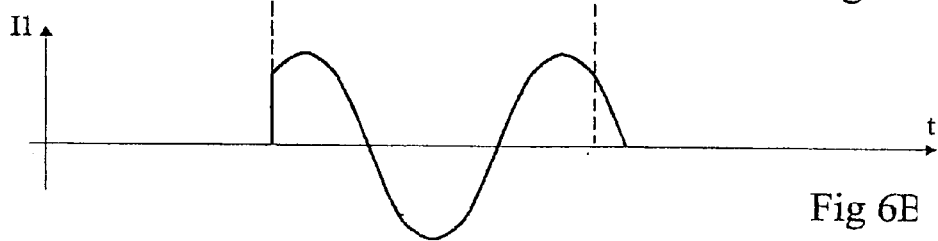

FIGS. 6A and 6B illustrate the operation of the control circuit of FIG. 5 for a purely resistive load 2. FIG. 6A illustrates the shape of voltage V1 across triac 1 and of A.C. supply voltage Vac. FIG. 6B illustrates the shape of current I1 in triac 1. FIGS. 6A and 6B should be compared with previously-described FIGS. 3A and 3B and, like for the latter, no account has been taken of leakage currents.

Initially, switch 4 is on so that triac 1 is off. Voltage V1 then follows voltage Vac.

It is assumed that at a time t1, control signal CTRL is switched to turn off switch 4. This results in a disappearing of voltage V1 and an immediate starting of triac 1. The triac blocks at the zero crossing of the current that it conducts. However, according to this embodiment of the present invention, it turns almost immediately back on at the beginning of the next halfwave due to the small current imposed by sources 51 and 52 to turn on the triac.

This results in a significant advantage which is that the firing delay of the triac is minimized (it has ideally disappeared in FIG. 6).

Upon turning-off of the circuit by a new switching at time t2 of control signal CTRL to turn on switch 4. The triac blocks as soon as the halfwave is finished, as was the case for the circuit of FIG. 2.

Figure 4A:
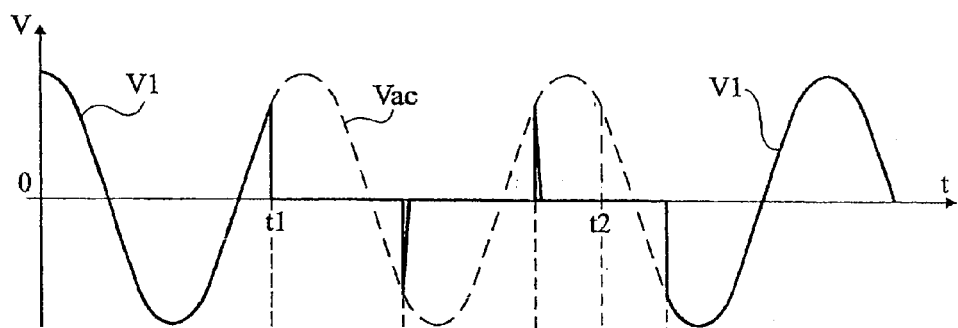
FIGS. 4A and 4B illustrate the operation of the assembly of FIG. 2 on an inductive load.
Figure 4B:
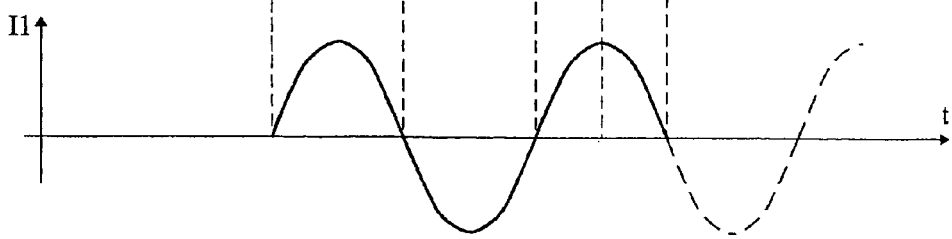
Figure 7A:
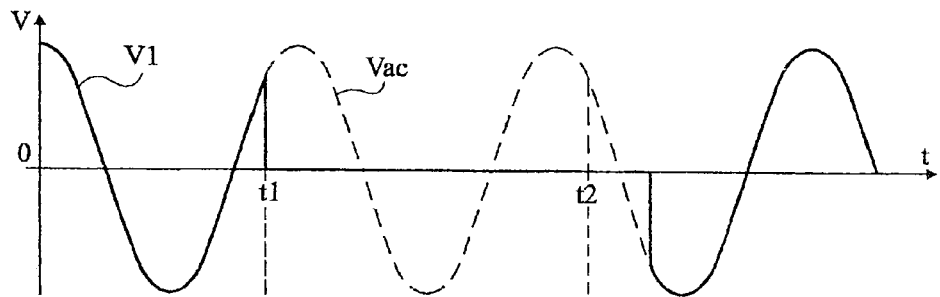
FIGS. 7A and 7B illustrate the operation of the circuit of FIG. 5 on an inductive load.
Figure 7B:

FIGS. 7A and 7B illustrate the operation of the circuit of FIG. 5 under an inductive load. These drawings should be compared with previously-described FIGS. 4A and 4B. FIG. 7A illustrates the shape of voltage V1 across triac 1 and of A.C. supply voltage Vac. FIG. 7B illustrates the shape of current I1 in triac 1.

Upon switching of signal CTRL turning off switch 4 (time t1), the triac immediately starts. However, it being an inductive load, current I1 starts from zero and is thus delayed (phase-shifted) with respect to the voltage course.

Upon zero crossing of current I1, no more current peaks occur across the triac. This is due to the fact that, although voltage Vac is at that time non-zero, the current is limited by one of sources 51 or 52.

At time t2 where the control signal of switch 4 reverses back, the triac blocks at the end of the current halfwave.

Figure 8:
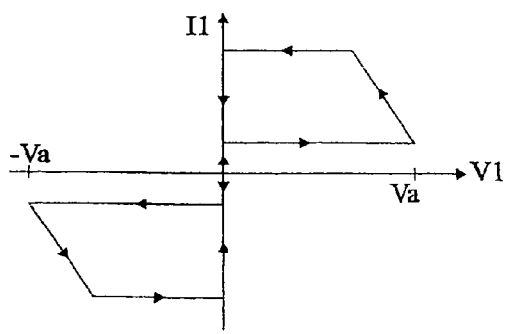
FIG. 8 shows the current-vs.-voltage characteristic of the switching circuit of FIG. 5.

FIG. 8 illustrates the current-vs.-voltage characteristic of a triac 1 equipped with a current-limiting element 5 according to an embodiment the present invention in the absence of a control signal (switch 4 on). As appears from the drawing, triac 1 become likely to be fired by break-over as soon as the voltage thereacross reaches a value Va. The voltage thereacross then cancels, allowing flowing of the current. In FIG. 8, the arrows illustrate, starting from a zero current I1 and voltage V1, the direction taken by the current-vs.-voltage characteristic after a positive or negative disturbance.

An advantage induced by an embodiment of the present invention then is that the assembly of the triac and the current-limiting element in its gate, provides a self-protected component, that is, it automatically starts as soon as the voltage thereacross exceeds voltage Va (for example, when disturbances linked to lightning are applied thereacross via load 2).

Figure 9:
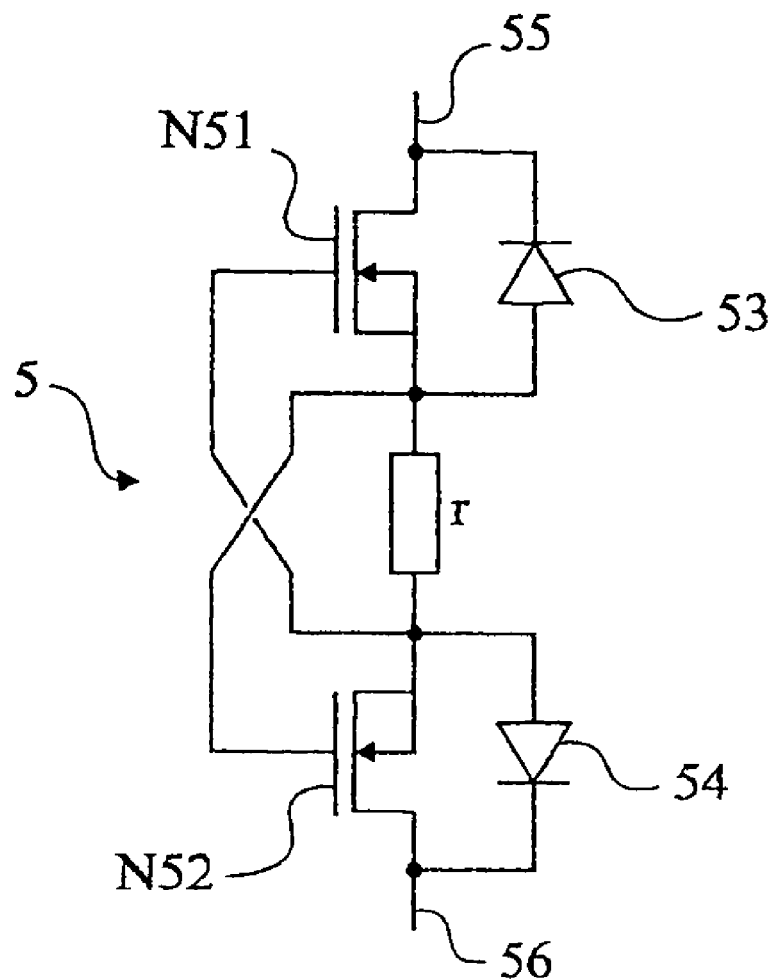
FIG. 9 shows an embodiment of an active current-limiting element according to the present invention.

FIG. 9 shows an embodiment of an active bidirectional current-limiting element 5 according to an embodiment of the present invention. According to this embodiment, two N-channel depleted MOS transistors N51 and N52 series connected with an interposed resistor r are used. Transistors N51 and N52 are head-to-tail (or in series-opposition) in that the drain of transistor N51 defines a terminal 55 external to element 5 to which is connected the cathode of diode 53 while the drain of transistor N52 defines the other external terminal 56 to which is connected the cathode of diode 54. Diodes 53 and 54 correspond in practice to the parasitic diodes of transistors N51 and N52. The respective sources of transistors N51, N52 are interconnected by resistor r. The gate of transistor N51 is connected to the anode of diode 54 corresponding to the source of transistor N52. The gate of transistor N52 is connected to the anode of diode 53 corresponding to the source of transistor N51.

In the example of FIG. 9, transistor N51 conducts upon positive halfwaves (positive voltage applied between terminals 55 and 56). Transistor N52 conducts in negative halfwaves. More specifically, during a positive half wave, the gate-source voltage of N51 is initially zero volts such that N51 is on (N51 and N52 are depletor-type transistors). Also, because the voltage between the gate of N52 and terminal 56 is initially zero, N52 is also on. As the current through N51 and N52 increases, the voltage across r increases, thus decreasing the gate-source voltage of N51, and increasing the gate-terminal 56 voltage of N52. This keeps N52 on, but causes N51 to limit the current through r. The parasitic diode 54 prevents the voltage across N52 from exceeding the forward voltage of the diode 54. During a negative half wave, N51, N52 and diode 53 respectively operate as N52, N51, and diode 54 operate during a positive half wave.

Resistor r defines the counter-injection enabling adjustment of the current in normally on transistors N51 and N52. Resistor r has a small value (typically from a few tens to a few hundreds of ohms).

In the case where depleted-type MOS transistors are used, resistor r can be omitted since the MOS transistors are then turned on for a zero gate voltage.

The element 5, as stated above, may be part of an integrated circuit, which may in turn be part of an electronic system that employs a triac.

Of course, the present invention is likely to have various alterations, modifications, and improvements which will readily occur to those skilled in the art. In particular, the practical forming of current-limiting element 5 is within the abilities of those skilled in the art based on the functional indications given hereabove. Similarly, the sizing of the possible resistor and of the transistors are within their abilities.

Such alterations, modifications, and improvements are intended to be part of this disclosure, and are intended to be within the spirit and the scope of the present invention. Accordingly, the foregoing description is by way of example only and is not intended to be limiting.

What is claimed is:

1. A circuit for controlling a triac, comprising:
   a bidirectional current-limiting active element connecting a triac gate to its opposite power electrode and excluding a resistor; and
   a switch connecting the gate to the other power electrode of the triac.

2. The circuit of claim 1, wherein the switch is of normally-on type.

3. The circuit of claim 1, wherein said current-limiting element is formed of two current sources connected head-to-tail.

4. The circuit of claim 3, wherein a diode is connected in parallel to each current source.

5. The circuit of claim 3, wherein said current sources are formed of N-channel MOS transistors.

6. The circuit of claim 5, wherein said transistors are depleted transistors.

7. A circuit for controlling a load intended to be supplied by an A.C. voltage of the type comprising a triac, comprising the circuit of claim 1.

8. A circuit for controlling a triac having a gate and first and second terminals, the circuit comprising:
   an active current source coupled between the gate and the first terminal of the triac; and
   a switch coupled between the gate and the second terminal of the triac.

9. The circuit of claim 8 wherein the switch:
   comprises a control terminal operable to receive a control signal; and
   is in a conducting state in the absence of the control signal.

10. The circuit of claim 8, wherein the triac is enabled when the switch is in a non-conducting state.

11. The circuit of claim 8 wherein the switch comprises a transistor.

12. A circuit for controlling a triac having a gate and first and second terminals, the circuit comprising:
    an active current limiter coupled between the gate and the first terminal of the triac;
    a switch coupled between the gate and the second terminal of the triac; and
    wherein the active current limiter comprises a pair of current sources coupled to one another.

13. The circuit of claim 12 wherein the current sources are coupled in series opposition to one another.

14. The circuit of claim 12 wherein the active current limiter further comprises a pair of diodes each in parallel to a respective one of the current sources.

15. The circuit of claim 12 wherein the current sources comprise respective transistors.

16. The circuit of claim 13 wherein the active current limiter further comprises a resistor serially coupled between the current sources.

17. The circuit of claim 12 wherein each of the current sources comprises a respective MOS transistor having a drain and a source and an inherent diode coupled between the drain and the source.

18. A method of controlling a triac having a gate and having first and second terminals coupled to an alternating-current power supply, the method comprising:
    activating the triac by supplying a current to the gate with an active current source coupled between the gate and the first terminal; and
    deactivating the triac by coupling the gate to the second terminal.

19. A system, comprising:
    first and second supply nodes;
    a load having a first terminal coupled to the first supply node and having a second terminal;
    a triac having a gate, a first terminal coupled to the second terminal of the load, and a second terminal coupled to the second supply node;
    an active current source coupled between the gate and one of the first and second terminals of the triac; and
    a switch coupled between the gate and the other of the first and second terminals of the triac.

20. The system of claim 19 wherein the load comprises an inductive load.

21. The system of claim 19 wherein:
    the active current source is coupled between the gate and the first terminal of the triac; and
    the switch is coupled between the gate and the second terminal of the triac.

22. A circuit for controlling a triac, comprising:
    a bidirectional current-limiting active element connecting the triac gate to its opposite power electrode;
    a switch connecting the gate to the other power electrode of the triac; and
    wherein said current-limiting element is formed of two current sources connected head-to-tail.

* * * * *